United States Patent
Kim et al.

(10) Patent No.: US 11,402,559 B2
(45) Date of Patent: Aug. 2, 2022

(54) OPTICAL FILTER WITH LAYERS HAVING REFRACTIVE INDEX GREATER THAN 3

(71) Applicant: OPTRONTEC CO., LTD., Changwon-si (KR)

(72) Inventors: Dong Hwan Kim, Daejeon (KR); Yun Sik Hwang, Sejong-si (KR); Won Young Kim, Daejeon (KR)

(73) Assignee: OPTRONTEC CO., LTD., Changwon-si (KR)

( * ) Notice: Subject to any disclaimer, the term of this patent is extended or adjusted under 35 U.S.C. 154(b) by 209 days.

(21) Appl. No.: 16/817,463

(22) Filed: Mar. 12, 2020

(65) Prior Publication Data

US 2020/0408976 A1 Dec. 31, 2020

(30) Foreign Application Priority Data

Jun. 27, 2019 (KR) .......................... 10-2019-0076886

(51) Int. Cl.
*G02B 5/20* (2006.01)
*G02B 5/28* (2006.01)

(52) U.S. Cl.
CPC ............. *G02B 5/285* (2013.01); *G02B 5/208* (2013.01); *G02B 5/281* (2013.01); *G02B 5/288* (2013.01)

(58) Field of Classification Search
CPC ........ G02B 5/208; G02B 5/281; G02B 5/282; G02B 5/285; G02B 5/286; G02B 5/287; G02B 5/288
See application file for complete search history.

(56) References Cited

U.S. PATENT DOCUMENTS

| 2020/0319386 A1* | 10/2020 | Chen ................. H01J 37/32449 |
| 2020/0408977 A1* | 12/2020 | Eisenhammer ......... C23C 14/10 |
| 2021/0255377 A1* | 8/2021 | Liu ..................... C23C 14/0057 |

FOREIGN PATENT DOCUMENTS

| CN | 108873135 A | 11/2018 |
| CN | 109061785 A | 12/2018 |
| CN | 212515117 | 2/2021 |
| WO | WO 2018/215044 A1 | 11/2018 |

OTHER PUBLICATIONS

First Office Action, State Intellectual Property Office of People's Republic of China Patent Application No. 202010353690.4, dated Apr. 26, 2022, 15 pages.

* cited by examiner

*Primary Examiner* — Ryan S Dunning
(74) *Attorney, Agent, or Firm* — Fenwick & West LLP

(57) ABSTRACT

An optical filter includes a substrate and a first filter layer stacked on a first surface of the substrate. The first filter layer includes a plurality of lower refractive index layers having a refractive index of less than 3; a plurality of higher refractive index layers having a refractive index of greater than 3; and a plurality of medium refractive index layers having a refractive index of 3 or more and smaller than that of the higher refractive index layers, and one higher refractive index layer and one medium refractive index layer are interposed in at least one of regions between two lower refractive index layers.

17 Claims, 15 Drawing Sheets

| Layer | Material | Thickness(nm) | Layer | Material | Thickness(nm) |
|---|---|---|---|---|---|
| 1 | SiO2 | 263.54 | 26 | a-SiCH | 287.86 |
| 2 | a-SiCH | 36.85 | 27 | a-SiH | 287.54 |
| 3 | a-SiH | 33.06 | 28 | SiO2 | 37.03 |
| 4 | SiO2 | 44.93 | 29 | a-SiCH | 71.42 |
| 5 | a-SiCH | 86.31 | 30 | a-SiH | 60.1 |
| 6 | a-SiH | 77.74 | 31 | SiO2 | 93.65 |
| 7 | SiO2 | 223.22 | 32 | a-SiCH | 39.89 |
| 8 | a-SiCH | 32.5 | 33 | a-SiH | 48.74 |
| 9 | a-SiH | 30.7 | 34 | SiO2 | 85.71 |
| 10 | SiO2 | 154.02 | 35 | a-SiCH | 143.58 |
| 11 | a-SiCH | 136.59 | 36 | a-SiH | 142.76 |
| 12 | a-SiH | 148.04 | 37 | SiO2 | 202.19 |
| 13 | SiO2 | 143.82 | 38 | a-SiCH | 28.04 |
| 14 | a-SiCH | 40.64 | 39 | a-SiH | 34.36 |
| 15 | a-SiH | 42.34 | 40 | SiO2 | 178.42 |
| 16 | SiO2 | 111.81 | 41 | a-SiCH | 54.3 |
| 17 | a-SiCH | 282.83 | 42 | a-SiH | 63 |
| 18 | a-SiH | 284.43 | 43 | SiO2 | 245.12 |
| 19 | SiO2 | 80.16 | 44 | a-SiCH | 38.29 |
| 20 | a-SiCH | 78.6 | 45 | a-SiH | 40.95 |
| 21 | a-SiH | 58.98 | 46 | SiO2 | 182.81 |
| 22 | SiO2 | 61.79 | 47 | a-SiCH | 38.98 |
| 23 | a-SiCH | 71.55 | 48 | a-SiH | 99.48 |
| 24 | a-SiH | 41.71 | 49 | SiO2 | 280.97 |
| 25 | SiO2 | 88.32 | Total Thickness | | 5439.67 |

| Layer | Material | Thickness(nm) | Layer | Material | Thickness(nm) |
|---|---|---|---|---|---|
| 1 | SiO2 | 263.54 | 26 | a-SiCH | 287.86 |
| 2 | a-SiCH | 36.85 | 27 | a-SiH | 287.54 |
| 3 | a-SiH | 33.06 | 28 | SiO2 | 37.03 |
| 4 | SiO2 | 44.93 | 29 | a-SiCH | 71.42 |
| 5 | a-SiCH | 86.31 | 30 | a-SiH | 60.1 |
| 6 | a-SiH | 77.74 | 31 | SiO2 | 93.65 |
| 7 | SiO2 | 223.22 | 32 | a-SiCH | 39.89 |
| 8 | a-SiCH | 32.5 | 33 | a-SiH | 48.74 |
| 9 | a-SiH | 30.7 | 34 | SiO2 | 85.71 |
| 10 | SiO2 | 154.02 | 35 | a-SiCH | 143.58 |
| 11 | a-SiCH | 136.59 | 36 | a-SiH | 142.76 |
| 12 | a-SiH | 148.04 | 37 | SiO2 | 202.19 |
| 13 | SiO2 | 143.82 | 38 | a-SiCH | 28.04 |
| 14 | a-SiCH | 40.64 | 39 | a-SiH | 34.36 |
| 15 | a-SiH | 42.34 | 40 | SiO2 | 178.42 |
| 16 | SiO2 | 111.81 | 41 | a-SiCH | 54.3 |
| 17 | a-SiCH | 282.83 | 42 | a-SiH | 63 |
| 18 | a-SiH | 284.43 | 43 | SiO2 | 245.12 |
| 19 | SiO2 | 80.16 | 44 | a-SiCH | 38.29 |
| 20 | a-SiCH | 78.6 | 45 | a-SiH | 40.95 |
| 21 | a-SiH | 58.98 | 46 | SiO2 | 182.81 |
| 22 | SiO2 | 61.79 | 47 | a-SiCH | 38.98 |
| 23 | a-SiCH | 71.55 | 48 | a-SiH | 99.48 |
| 24 | a-SiH | 41.71 | 49 | SiO2 | 280.97 |
| 25 | SiO2 | 88.32 | Total Thickness | | 5439.67 |

FIG. 10

| Layer | Material | Thickness (nm) |
|---|---|---|
| 1 | SiH | 21.93 |
| 2 | $SiO_2$ | 104.26 |
| 3 | SiH | 29.63 |
| 4 | $SiO_2$ | 271.19 |
| 5 | SiH | 19.95 |
| 6 | $SiO_2$ | 113.01 |
| 7 | SiH | 43.55 |
| 8 | $SiO_2$ | 168.57 |
| 9 | SiH | 35.6 |
| 10 | $SiO_2$ | 127.12 |
| 11 | SiH | 39.48 |
| 12 | $SiO_2$ | 138.94 |
| 13 | SiH | 47.05 |
| 14 | $SiO_2$ | 141.12 |
| 15 | SiH | 36.86 |
| 16 | $SiO_2$ | 132.25 |
| 17 | SiH | 172.34 |
| 18 | $SiO_2$ | 195.46 |
| 19 | SiH | 42.93 |
| 20 | $SiO_2$ | 140.54 |
| 21 | SiH | 156.86 |
| 22 | $SiO_2$ | 171.27 |
| 23 | SiH | 71.22 |
| 24 | $SiO_2$ | 170.37 |
| 25 | SiH | 143.64 |
| 26 | $SiO_2$ | 186.11 |
| 27 | SiH | 58.71 |
| 28 | $SiO_2$ | 170.17 |
| 29 | SiH | 139.51 |
| 30 | $SiO_2$ | 167.71 |
| 31 | SiH | 103.47 |
| 32 | $SiO_2$ | 209.4 |
| 33 | SiH | 125.9 |
| 34 | $SiO_2$ | 59.12 |
| Total Thickness | | 3955.24 |

FIG. 12

| Layer | Material | Thickness (nm) |
|---|---|---|
| 1 | SiO2 | 155.09 |
| 2 | a-SiCH | 24.84 |
| 3 | SiO2 | 111.66 |
| 4 | a-SiCH | 30.15 |
| 5 | SiO2 | 180.29 |
| 6 | a-SiCH | 27.84 |
| 7 | SiO2 | 159.87 |
| 8 | a-SiCH | 28.29 |
| 9 | SiO2 | 151.92 |
| 10 | a-SiCH | 35.43 |
| 11 | SiO2 | 150.65 |
| 12 | a-SiCH | 23.21 |
| 13 | SiO2 | 188.71 |
| 14 | a-SiCH | 81.72 |
| 15 | SiO2 | 28.29 |
| 16 | a-SiCH | 53.61 |
| 17 | SiO2 | 180.1 |
| 18 | a-SiCH | 21.46 |
| 19 | SiO2 | 200.65 |
| 20 | a-SiCH | 158.51 |
| 21 | SiO2 | 183.7 |
| 22 | a-SiCH | 20.28 |
| 23 | SiO2 | 176.82 |
| 24 | a-SiCH | 172.51 |
| 25 | SiO2 | 124.6 |
| 26 | a-SiCH | 28.98 |
| 27 | SiO2 | 163.68 |
| 28 | a-SiCH | 173.44 |
| 29 | SiO2 | 106.71 |
| 30 | a-SiCH | 20.39 |
| 31 | SiO2 | 260.21 |
| 32 | a-SiCH | 132.93 |
| 33 | SiO2 | 99.62 |
| Total Thickness | | 3656.16 |

OPTICAL FILTER WITH LAYERS HAVING REFRACTIVE INDEX GREATER THAN 3

CROSS-REFERENCE TO RELATED APPLICATION

This patent document claims priority to and the benefit of Republic of Korea Patent Application No. 10-2019-0076886, filed on Jun. 27, 2019, which is incorporated by reference for all purposes as if fully set forth herein.

BACKGROUND

Exemplary embodiments relate to an optical filter including thin films having different refractive indexes.

An optical filter is an optical device adapted to allow transmission of light in a target wavelength band therethrough or to block the light. For example, for an application, such as a camera module, which requires frequencies or colors in a selected range, it is necessary to restrict the wavelength range of light. To this end, an optical filter adapted to allow selective reflection, refraction, diffraction or absorption of light in a unwanted wavelength range while allowing transmission of light in the other wavelength range therethrough may be used.

Optical filters for controlling the wavelengths of light in the infrared (IR) spectrum are attracting attention as one of key components in virtual reality (VR), augmented reality (AR), autonomous vehicles, drones, face recognition, iris recognition, gesture recognition, and the like. For application of functions, such as facial recognition, iris recognition, gesture recognition, and the like to smart devices, it is necessary to develop an optical filter having a lower thickness while having high transmission performance with respect to light in a specific IR wavelength range and high blocking performance with respect to light in the remaining wavelength range.

In general, an optical filter includes a filter stack disposed on a substrate and having a structure in which higher refractive index layers and lower refractive index layers are alternately stacked one above another. It is possible to manufacture an optical filter adapted to allow transmission of light in a target wavelength range through adjustment of the refractive index of each of the higher and lower refractive index layers, the total number of layers, the thickness of each layer, and the like.

Since light passes through all of the layers in the stack of the optical filter to transmit the optical filter, both the higher refractive index layers and the lower refractive index layers are selected to have low extinction coefficients. Silicon oxides or silicon nitrides, such as SiOx or SiNx, have a relatively low refractive index of less than 2.0 and have a very small extinction coefficient and thus are suitable for the lower refractive index layers. Hydrogenated silicon (Si:H) has a high refractive index and a relatively small extinction coefficient, and thus has been used for the higher refractive index layers for a long period of time.

However, although the optical filter using two types of layers, that is, the higher refractive index layers and the lower refractive index layers, has an advantage of a simple structure, such an optical filter has a limitation in accurate design suitable for target wavelengths. In particular, the refractive index of an Si:H layer tends to decrease with decreasing extinction coefficient thereof and tends to increase with increasing extinction coefficient thereof. Moreover, the Si:H layer has a relatively high extinction coefficient in the near IR wavelength spectrum close to visible light and thus has a limitation in increase in transmission.

SUMMARY

Exemplary embodiments provide an optical filter that can be accurately designed to allow selective transmission of light in a target wavelength band.

Exemplary embodiments provide an optical filter that has high transmission and high blocking performance with respect to light in a specific wavelength range in the near IR wavelength spectrum.

An exemplary embodiment provides an optical filter including: a substrate; and a first filter layer stacked on a first surface of the substrate, wherein the first filter layer includes a plurality of lower refractive index layers having a refractive index of less than 3; a plurality of higher refractive index layers having a refractive index of greater than 3; and a plurality of medium refractive index layers having a refractive index of 3 or more and smaller than that of the higher refractive index layers, and one higher refractive index layer and one medium refractive index layer are interposed in at least one of regions between two lower refractive index layers.

The optical filter can be accurately designed by adopting the medium refractive index layers having a refractive index of 3 or more together with the higher refractive index layers, thereby improving performance of the optical filter.

In one embodiment, each of the higher refractive index layers may include a hydrogenated silicon (Si:H) layer and each of the medium refractive index layers may include a carbon-added hydrogenated silicon (SiC:H) layer. The carbon-added hydrogenated silicon layers have a smaller extinction coefficient than the hydrogenated silicon layer, whereby the optical filter can have improved transmission.

The optical filter may have a transmission of 96% or more in a specific wavelength range and a central wavelength blue shift of less than 12 nm at an angle of incidence in the range of 0 to 30 degrees.

The first filter layer may be a band pass filter allowing transmission of light in the specific wavelength range.

In one embodiment, the specific wavelength range may be in the range of 800 nm to 1,000 nm.

The carbon-added hydrogenated silicon (SiC:H) layer may have a local minimum of an extinction coefficient less than 0.0001 in the wavelength range of 800 nm to 1,000 nm. The local minimum of the extinction coefficient may be present in the wavelength range of 800 nm to 900 nm or in the wavelength range of 900 nm to 1,000 nm.

The lower refractive index layers may include at least one selected from the group consisting of SiOx, TiOx, NbOx, TaOx, AlOx, SiNx, TiNx, NbNx, TaNx, AlNx, and mixtures thereof.

In one embodiment, one higher refractive index layer and one medium refractive index layer may be interposed in each of the regions between two lower refractive index layers.

In some embodiments, the optical filter may include pairs of higher refractive index layers and medium refractive index layers each pair including a higher refractive index layer and a medium refractive index layer disposed adjacent to each other and at least two of the pairs may have a total optical thickness 1.6 times greater than a central wavelength, respectively.

Each of the at least two pairs of higher refractive index layers and medium refractive index layers may have a total optical thickness 2 times greater than the central wavelength.

Each of the at least two pairs may include a higher refractive index layer having an optical thickness greater than the central wavelength.

Each of the at least two pairs may include a medium refractive index layer having an optical thickness greater than the central wavelength.

At least three lower refractive index layers may be disposed between the at least two pairs of higher refractive index layers and medium refractive index layers, and a higher refractive index layer disposed in each of regions between the at least three lower refractive index layers may have a smaller optical thickness than the medium refractive index layer adjacent thereto.

As used herein, unless specifically stated otherwise, the term "central wavelength" means a wavelength at the center of a wavelength band having a transmission of 50% or more. In addition, the term "pass band" means a wavelength band where the transmission is maintained at a particular value or more and may be defined together with a certain transmission like, for example, a pass band having a transmission of 50% or more, a pass band having a transmission of 90% or more, and the like. Unless specifically stated otherwise, the term "pass band" means a pass band having a transmission of 50% or more. The term "transition region" means a wavelength range where the transmission is decreased to a predetermined value from the pass band. Here, the predetermined value may be a transmission of 5% or less and may be determined depending upon a blocking level. A region outside the pass band and the transition region is generally referred to a blocking region.

The optical filter may further include a second filter layer disposed on the substrate and formed by alternately stacking layers having different refractive indexes. Furthermore, the layers having different refractive indexes may include a carbon-added hydrogenated silicon (SiC:H) layer.

The second filter layer may have a blocking rate of 95% or more with respect to at least some fraction of light in the visible spectrum.

A total thickness of the first filter layer and the second filter layer may be less than 10 μm.

In one embodiment, the first filter layer may be a band pass filter and the second filter layer may have a pass band including a pass band of the first filter layer.

The first filter layer may be formed on the substrate by a middle frequency (MF) magnetron sputtering method.

Exemplary embodiments may provide an optical filter that has a reduced thickness and high transmission with respect to light in a specific wavelength range. In addition, exemplary embodiments may provide an optical filter that reduces a blue shift of the central wavelength due to an increase in angle of incidence.

Furthermore, exemplary embodiments may provide an optical filter that can be accurately designed to be suitable for target wavelengths through increase in design parameters.

The above and other features and advantages of the present disclosure will become apparent from the following description.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 6 is a table illustrating thicknesses of layers in a first filter layer of an optical filter according to an exemplary embodiment.

FIG. 10 is a table illustrating a structure and thickness of each of layers in a second filter layer of the optical filter according to the exemplary embodiment.

FIG. 12 is a table illustrating a structure and thickness of each of layers in a second filter layer according to an exemplary embodiment.

DETAILED DESCRIPTION

Figure 1:
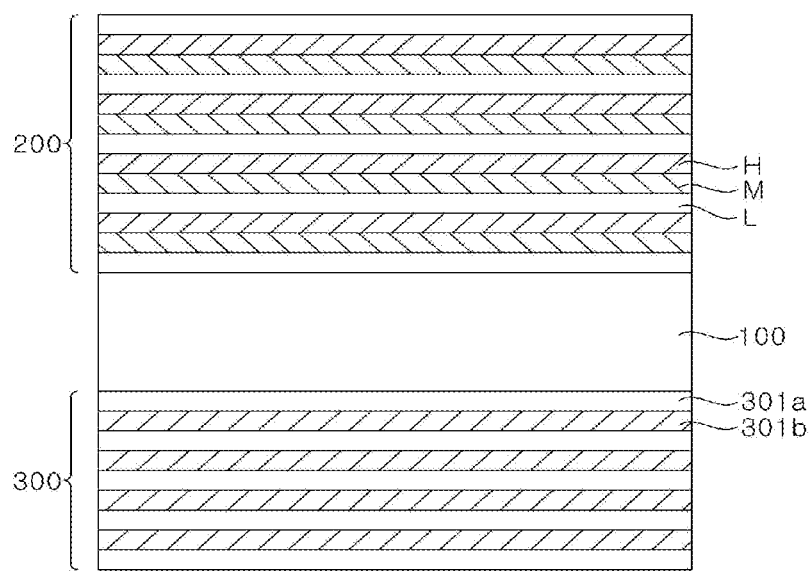
FIG. 1 is a schematic sectional view of an optical filter according to an exemplary embodiment.

Hereinafter, exemplary embodiments will be described in detail with reference to the accompanying drawings so as to fully convey the spirit of the present disclosure to those skilled in the art. However, it should be understood that the present disclosure is not limited to the following exemplary embodiments and that various modifications, substitutions, and equivalent embodiments can be made by those skilled in the art without departing from the spirit and scope of the present disclosure.

In the drawings, widths, lengths, thicknesses, and the like of layers or regions are exaggerated for clarity and description. When an element is referred to as being "disposed on" another element, it can be directly "disposed on" the other element, or intervening elements can be present. Throughout the specification, like reference numerals denote like elements. In addition, like elements having the same or similar functions within the same technical spirit or idea shown in the drawings of each embodiment will be illustrated using the same reference numerals.

Detailed description of known functions and constructions which can unnecessarily obscure the subject matter of the present disclosure will be omitted. In addition, it should be understood that numerals, for example, first, second, and the like, in description of elements are used as marks for distinguishing one element from other elements.

Herein, 'optical filter', 'optical film', 'optical coating', or 'thin film filter' means a device that allows selective transmission of light in a certain wavelength band or prevents the light from passing therethrough.

Here, the optical filter, the optical film, the optical coating, or the thin film filter may include multiple thin films or coating layers.

An optical filter having target transmission or reflection characteristics may be produced through combination of materials, number and thicknesses of thin films or coating layers in various ways.

In general, optical filters can be classified into an absorption filter and an interference filter.

The absorption filter can block light using a material selectively absorbing light in a certain wavelength band.

Unlike the absorption filter, the interference filter can restrict transmittable wavelengths by destructively interfering undesirable wavelengths using an interference phenomenon of light instead of absorbing the light. Selectively, a material absorbing light in a certain wavelength band may be further deposited on the interference filter in order to improve performance of the filter.

In general, the interference filter can remove unnecessary radiation such as ambient light by depositing multiple thin films on the substrate.

For example, light incident on a multilayer dielectric surface passes through or is reflected by a constructive reinforcement filter and undergoes reduction in intensity by destructive interference.

The transmission and reflection characteristics of the interference filter can be determined by materials, number and thicknesses of layers deposited therein.

FIG. 1 is a schematic sectional view of an optical filter 10 according to an exemplary embodiment. Referring to FIG. 1, the optical filter 10 includes a substrate 100, a first filter layer 200, and a second filter layer 300. The substrate 100 is a transparent substrate that transmits light in a target wavelength range and may be, for example, a glass substrate or a quartz substrate. The glass substrate 100 may have a refractive index of about 1.5. The substrate 100 supports the first filter layer 200 and the second filter layer 300.

The first filter layer 200 may be disposed on a first surface of the substrate 100. The first filter layer 200 may be formed on the substrate 100 through deposition, without being limited thereto. For example, the first filter layer 200 may be deposited on a separate substrate, such as a temporary substrate, and then attached to the substrate 100.

The first filter layer 200 includes a plurality of lower refractive index layers L, a plurality of higher refractive index layers H, and a plurality of medium refractive index layers M. As shown in FIG. 1, the first filter layer 200 may have a repeated structure of LMH stacked in the sequence of L/M/H/L/M/H. Although both the uppermost layer and the lowermost layer may be lower refractive index layers L, it should be understood that other implementations are possible.

As shown in FIG. 1, a medium refractive index layer M and a higher refractive index layer H are disposed in a region between two lower refractive index layers L. Although the medium refractive index layer M and the higher refractive index layer H may be disposed in each of regions between two lower refractive index layers L, it should be understood that other implementations are possible. In some regions, one of the medium refractive index layer M and the higher refractive index layer H may be disposed and a different kind of refractive index layer may be additionally disposed.

Figure 2:
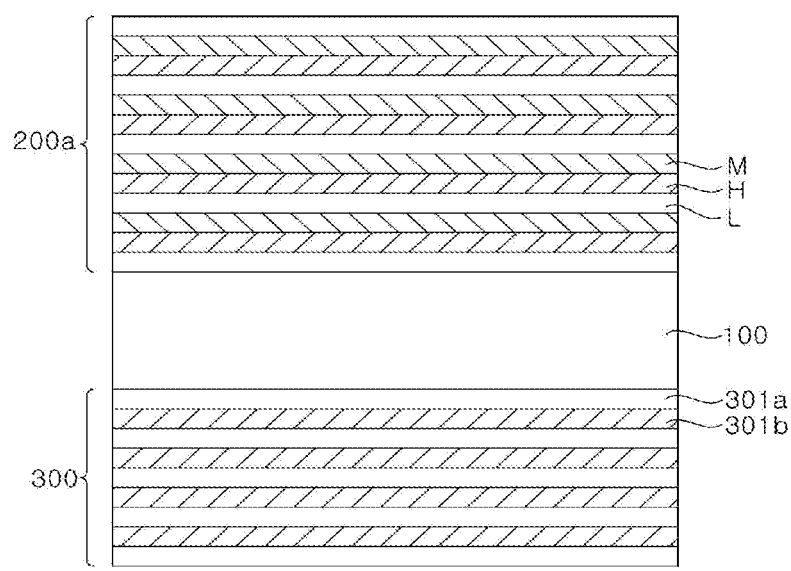
FIG. 2 is a schematic sectional view of an optical filter according to an exemplary embodiment.

In the optical filter 10 shown in FIG. 1, the medium refractive index layer M is disposed closer to the substrate 100 than the higher refractive index layer H adjacent to the medium refractive index layer M. Alternatively, as in an optical filter 10a shown in FIG. 2, the medium refractive index layer M may be disposed farther from the substrate 100 than the higher refractive index layer H. In addition, in each of the optical filters 10, 10a shown in FIG. 1 and FIG. 2, the pairs of medium refractive index layers M and higher refractive index layers H are disposed in the same stacking sequence in each of the regions between the lower refractive index layers L. However, it should be understood that other implementations are possible. Alternatively, the stacking sequence of the medium refractive index layer M and the higher refractive index layer H interposed between the lower refractive index layers L may be changed depending upon locations thereof.

In addition to the higher refractive index layer H and the lower refractive index layer L, the optical filter adopts the medium refractive index layer M, thereby adding a parameter for design of the optical filter. As a result, it is possible to provide a high performance optical filter by precisely designing the optical filter to be suitable for predetermined wavelengths.

Here, the higher refractive index layer H may be formed of a material having a refractive index of greater than 3. Specifically, the higher refractive index layer H may have a refractive index of about 3.4 or more at a wavelength of 940 nm. For example, the higher refractive index layer H may be formed of hydrogenated silicon (Si:H).

The medium refractive index layer M may be formed of a material having a refractive index of 3 or more and smaller than that of the higher refractive index layer H. Specifically, the medium refractive index layer M may have a refractive index of about 3.3 or more at a wavelength of 940 nm. For example, the medium refractive index layer M may be formed of carbon-added hydrogenated silicon (SiC:H).

The lower refractive index layer L may be formed of a material having a refractive index of less than 3. The lower refractive index layer L may be formed of a material having a refractive index of less than 3 at a wavelength of 940 nm, specifically less than 2, more specifically less than about 1.5. The lower refractive index layer L may include, for example, SiOx (for example, SiO2), TiOx (for example, TiO2), NbOx (for example, Nb2O5), TaOx (for example, Ta2O5), or AlOx (for example, Al2O3).

The layer structure of the first filter layer 200 and thickness of each of the layers L, M, H will be described below in detail with reference to FIG. 6 to FIG. 8.

The second filter layer 300 may be disposed on a second surface of the substrate 100, which is opposite the first surface thereof. Although the second filter layer 300 may be formed on the second surface of the substrate 100 by deposition, it should be understood that other implementations are possible. For example, the second filter layer 300 may be deposited on a separate substrate, such as a temporary substrate, and then attached to the substrate 100.

The second filter layer 300 may include a plurality of lower refractive index layers 301a and a plurality of higher refractive index layers 301b, which are alternately stacked one above another. In addition, the uppermost layer and the lowermost layer of the second filter layer 300 may be the lower refractive index layers 301a, specifically SiOx (for example, SiO2) layers.

The lower refractive index layers 301a may include, for example, SiOx (for example, SiO2), TiOx (for example, TiO2), NbOx (for example, Nb2O5), TaOx (for example, Ta2O5), or AlOx (for example, Al2O3). In particular, the lower refractive index layers 301a may be formed of SiO2.

The higher refractive index layers 301b may be, for example, hydrogenated silicon (Si:H) layers or carbon-added hydrogenated silicon (SiC:H) layers.

The second filter layer 300 may act as an anti-reflection coating that prevents light having passed through the first surface of the substrate and having wavelengths in a specific band from being reflected by the second surface of the substrate. For example, the second filter layer 300 may have high transmission with respect to light having wavelengths in a pass band of the first filter layer. Furthermore, the second filter layer 300 may block at least some fraction of light having passed through the first surface of the substrate 100 and having a wavelength outside the pass band of the first filter layer 200. The second filter layer 300 may be, for example, a band pass filter and may have, particularly, a wavelength band overlapping the pass band of the first filter layer. Furthermore, when the first filter layer 200 is the band pass filter, the second filter layer 300 may have a broader pass band than the first filter layer 200 and the pass band of the second filter layer 300 may include the pass band of the first filter layer 200. In this case, the pass band of each of the optical filters 10, 10a may be determined by a region in which the pass band of the first filter layer 200 overlaps the pass band of the second filter layer 300, that is, by the pass band of the first filter layer 200.

The layer structure of the second filter layer 300 and thickness of each of the layers 301a, 301b will be described below in detail with reference to FIG. 10 to FIG. 12.

Each of the layers in the first filter layer 200 and the second filter layer 300 may be formed by various deposition methods. For example, thin film deposition may be performed by chemical vapor deposition (CVD), evaporation, sputtering, or the like.

Sputtering is a physical vapor deposition process and is performed by forcing ions to collide with a target acting as a source to emit target materials to the substrate, with a vacuum container filled with an inert gas, thereby forming a thin film on the substrate.

In such a sputtering deposition process, deposition is achieved by forcing the target materials provided in the form of atoms to strongly collide with the substrate, thereby providing higher adhesion strength of the thin film than other deposition processes, such as CVD, evaporation, and the like.

For example, sputtering deposition may include DC sputtering performed using DC power, DC-pulse sputtering performed using DC pulses, MF or RF sputtering performed using AC power, ion beam sputtering using ion sources to generate ion beams focused on a target, magnetron sputtering performed using plasma ions restricted between a substrate and a target by a magnetic field, and the like.

For magnetron sputtering, a permanent magnet or an electromagnet is provided to a rear side of a target in order to improve ionization of the target and atoms emitted by a magnetic field may be locally collected in a magnetic field generated outside the target to promote collision with a reactive gas, thereby improving sputtering efficiency.

Magnetron sputtering using MF can compensate for a disadvantage of arcing generation due to DC power while maintaining a high deposition rate, as compared with RF magnetron sputtering. Thus, magnetron sputtering is suitable for mass production of optical filters. However, the present disclosure is not limited to MF magnetron sputtering and various thin film deposition methods can also be used.

Figure 3:
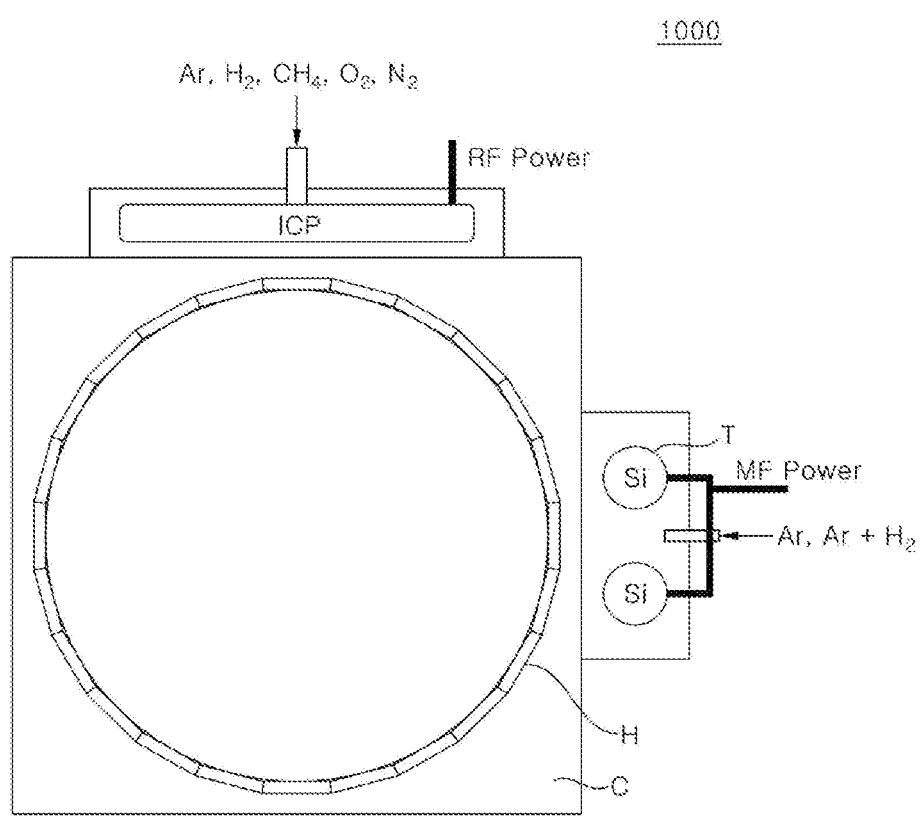
FIG. 3 is a schematic sectional view of an MF magnetron sputtering apparatus according to an exemplary embodiment.

FIG. 3 is a schematic sectional view of an MF magnetron sputtering apparatus 1000 according to an exemplary embodiment. Referring to FIG. 3, the sputtering apparatus 1000 may include a vacuum chamber C, a substrate holder H, inductively coupled plasma (ICP), and a target T. The vacuum chamber C is maintained in a vacuum to deposit a thin film in the chamber and may have an initial vacuum of 5.0E-3 Pa or less.

The vacuum chamber C may be provided therein with a cylindrical drum and a plurality of substrate holders H disposed along the circumference of the drum. Each of the substrate holders H may be provided with a substrate on which a thin film will be deposited. As the cylindrical drum is rotated, multiple coating layers may be deposited on the substrates disposed in the substrate holders H.

As described above, the substrate may be a transparent substrate allowing light in a specific wavelength range to pass therethrough, and may include, for example, a glass substrate or a quartz substrate. For example, for deposition of multiple thin films on a transparent glass substrate, the first filter layer is deposited on the first surface of the substrate, followed by depositing the second filter layer on the second surface of the substrate opposite the first surface thereof, or the second filter layer is deposited on the second surface of the substrate opposite the first surface thereof, followed by depositing the first filter layer on the first surface of the substrate.

The target T may be formed of at least one selected from the group consisting of Si, Ge, Ga, As, Al, Sb, Zr, Nb, Ti, Mo, and mixtures thereof.

A thin film may be formed on the substrate by supplying MF power to the target T and injecting argon Ar gas to generate plasma.

The MF power applied to the target may range, for example, from 1 kW to 20 kW, specifically, from 3 kW to 12 kW.

In addition, for example, argon (Ar) gas may be injected into the chamber C at a flux of 10 sccm (standard cubic centimeter per minute) to 500 sccm, more specifically 50 sccm to 300 sccm.

Further, an RF power of 0.5 kW to 5 kW may be supplied to inductively coupled plasma (ICP) to form a target coating layer on the substrate.

For example, a reactive gas H2 may be injected at a flux of 10 sccm to 500 sccm to inductively coupled plasma (ICP). When a Si target is used, a hydrogenated silicon (Si:H) layer can be formed on the substrate.

Furthermore, while the reactive gas H2 is injected at a flux of 10 sccm to 500 sccm to inductively coupled plasma (ICP), a carbon-containing gas such as CH4 or C2H2 may also be supplied at a flux of 5 sccm to 500 sccm. In this case, a carbon-added hydrogenated silicon (SiC:H) layer may be formed on the substrate.

Alternatively, for example, a hydrogen (H), oxygen (O), nitrogen (N), or carbon (C) containing reactive gas, such as $H_2$, $O_2$, $N_2$ or $CO_2$, may be supplied at a flux of 50 sccm to 500 sccm to ICP. In this case, a coating layer, such as SiOx (for example, $SiO_2$), SiNx (for example, $Si_3N_4$), TiOx (for example, $TiO_2$), NbOx (for example, $Nb_2O_5$), TaOx (for example, $Ta_2O_5$), or AlOx (for example, $Al_2O_3$), may be formed corresponding to a target material on the substrate.

The multiple coating layers may be deposited on the first and second surfaces of the substrate by the process described above, and desirable optical characteristics can be obtained by adjusting materials to be deposited on the substrate, the number of layers, and the thicknesses of the layers.

Although the first filter layer and the second filter layer are illustrated as being deposited by MF magnetron sputtering for convenience of description, it should be understood that embodiments of the present disclosure are not limited to the layers deposited by MF magnetron sputtering, optical filters according to embodiments of the present disclosure may be manufactured by various deposition methods well-known in the art in addition to magnetron sputtering.

Figure 4A:
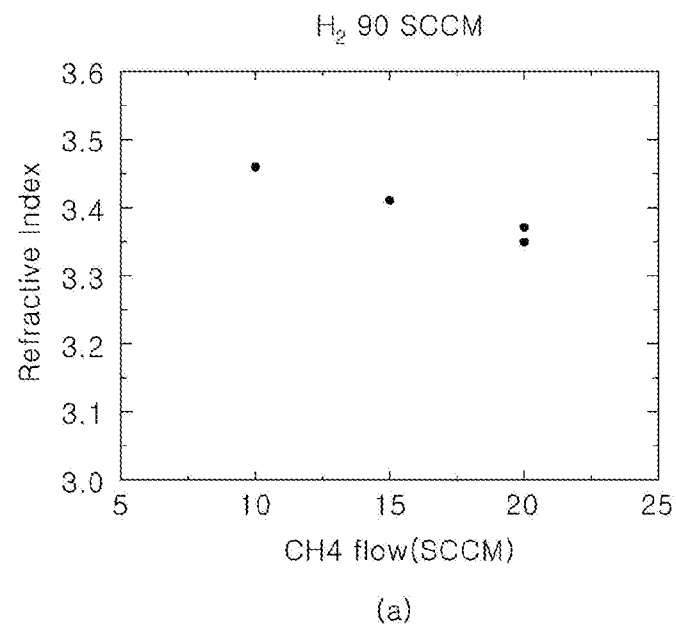
FIG. 4A, FIG. 4B and FIG. 4C are graphs depicting refractive index and extinction coefficient values of an SiC:H layer depending upon fluxes of H2 and CH4 in an MF magnetron sputtering apparatus.
Figure 4A:
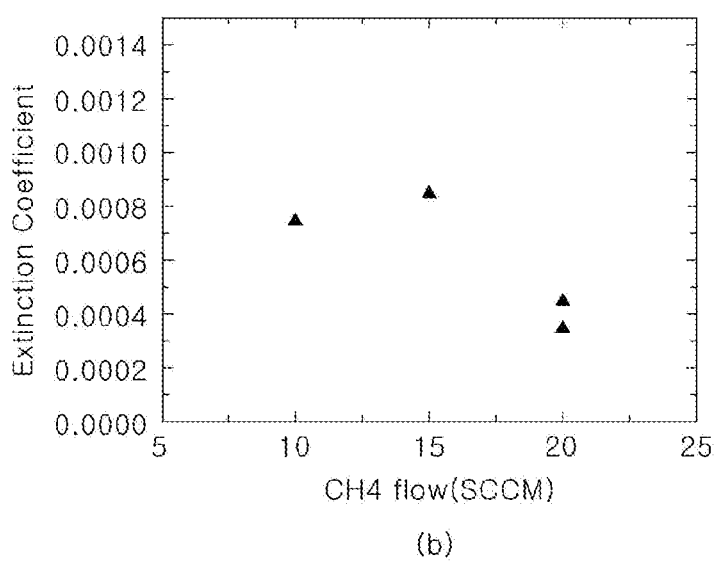
Figure 4B:
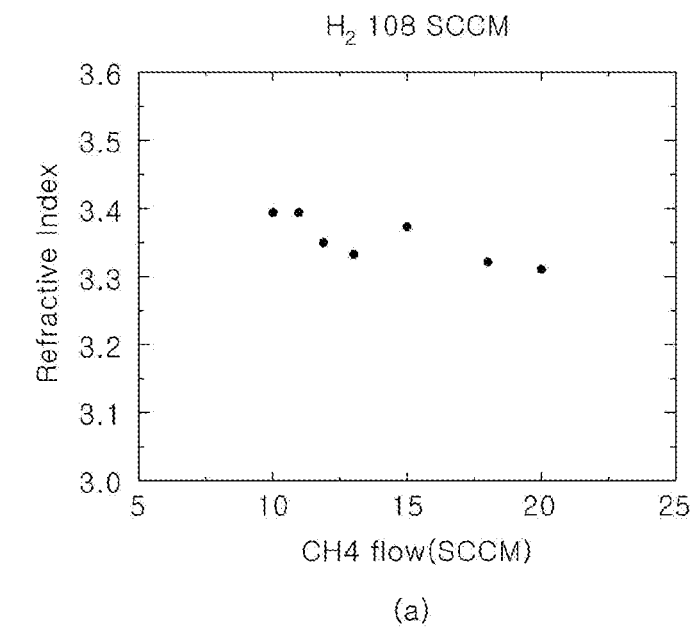
Figure 4B:
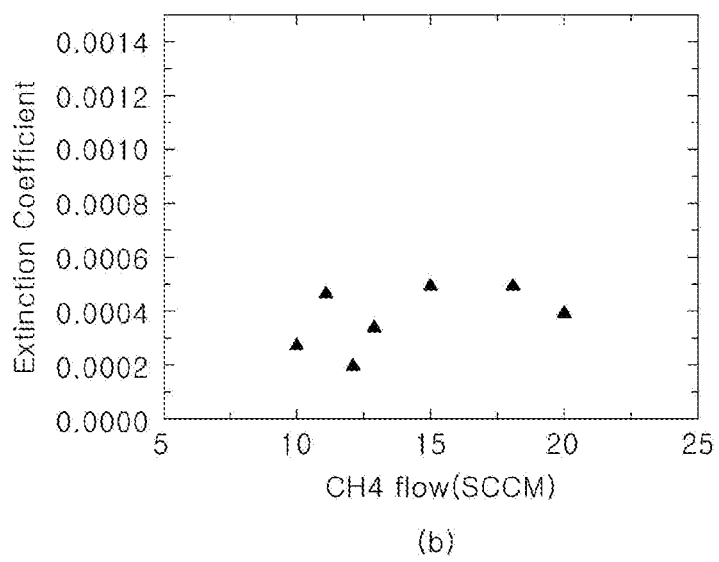
Figure 4C:
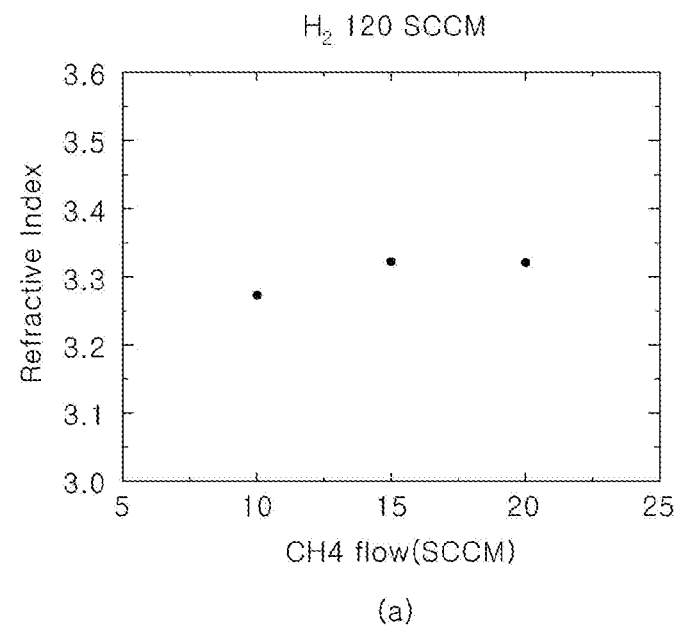
Figure 4C:
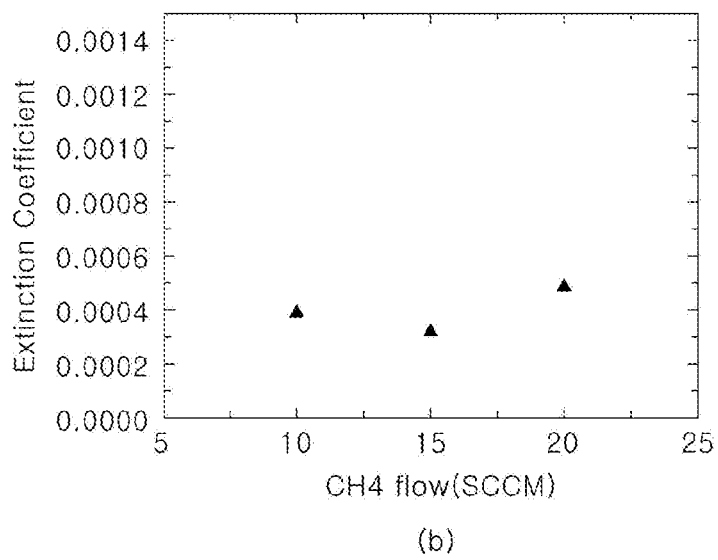

FIG. 4A, FIG. 4B and FIG. 4C are graphs depicting refractive index and extinction coefficient values of an SiC:H layer depending upon fluxes of $H_2$ and $CH_4$ in the MF magnetron sputtering apparatus 1000. The refractive indexes and the extinction coefficients were measured at a wavelength of 940 nm under the same conditions excluding the fluxes of $H_2$ and $CH_4$. Here, the fluxes of $H_2$ and $CH_4$ indicate the fluxes of $H_2$ and $CH_4$ reactive gases supplied to ICP.

As the flux of $H_2$ increased from 90 sccm to 120 sccm, the refractive index of the SiC:H layer tended to decrease. As the flux of $CH_4$ increased with the flux of $H_2$ maintained at a certain value, the refractive index of the SiC:H layer generally tended to decrease. Here, when the flux of $H_2$ was 120 sccm, the refractive index of the SiC:H layer tended to slightly increase with increasing flux of $CH_4$.

When the flux of $H_2$ was 90 sccm, the extinction coefficient generally tended to increase with increasing flux of $CH_4$. However, when the flux of $H_2$ was 108 sccm or 120 sccm, the extinction coefficient tended to slightly increase without significant change, as the flux of $CH_4$ increased.

The refractive index and the extinction coefficient of the SiC:H layer may be controlled by regulating the fluxes of $H_2$ and $CH_4$. The refractive index and the extinction coefficient of the hydrogenated silicon (Si:H) layer may also be controlled by regulating the flux of $H_2$.

Figure 5A:
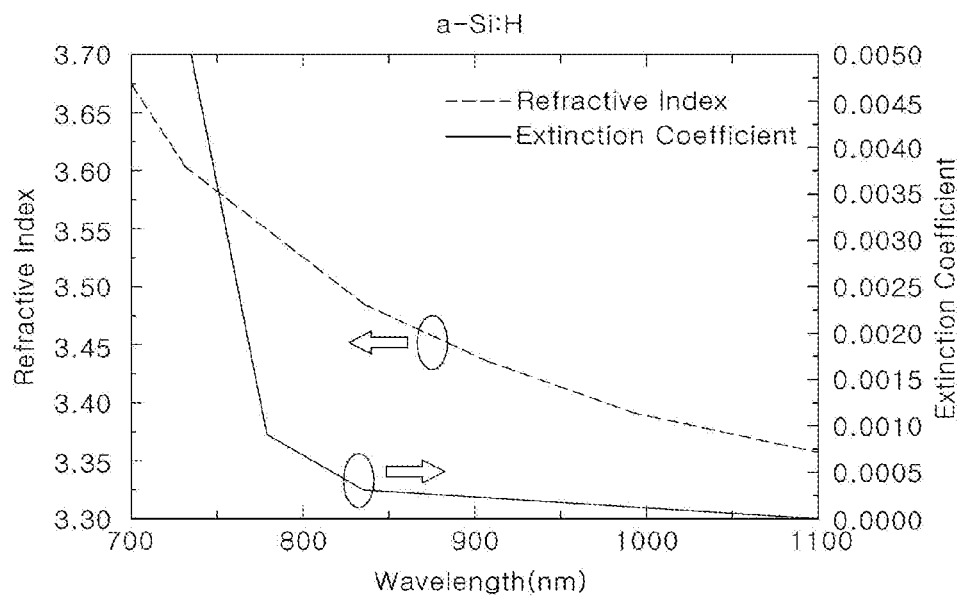
FIG. 5A is a graph depicting refractive index and extinction coefficient values of an Si:H layer suitable for an optical filter according to an exemplary embodiment depending upon wavelength.

FIG. 5A is a graph depicting refractive index and extinction coefficient values of an Si:H layer suitable for the optical filter according to the one embodiment of the present disclosure depending upon wavelength. The refractive index and the extinction coefficient of the Si:H layer were calculated by depositing a single layer on a glass substrate and measuring transmission and reflectivity of the single layer, followed by accurate calculation using Macleod software.

Referring to FIG. 5A, the refractive index of the Si:H layer monotonously decreased in the wavelength range of 700 nm to 1,100 nm. The refractive index of the Si:H layer was higher than 3.3 in the wavelength range of 700 nm to 1,100 nm and was higher than about 3.4 at a wavelength of 940 nm.

The extinction coefficient of the Si:H layer rapidly decreased as the wavelength increased from 700 nm, and tended to gradually decrease in the wavelength range of 900 nm to 1100 nm. The extinction coefficient of the Si:H layer was less than 0.0005 at a wavelength of about 820 nm or more.

Figure 5B:
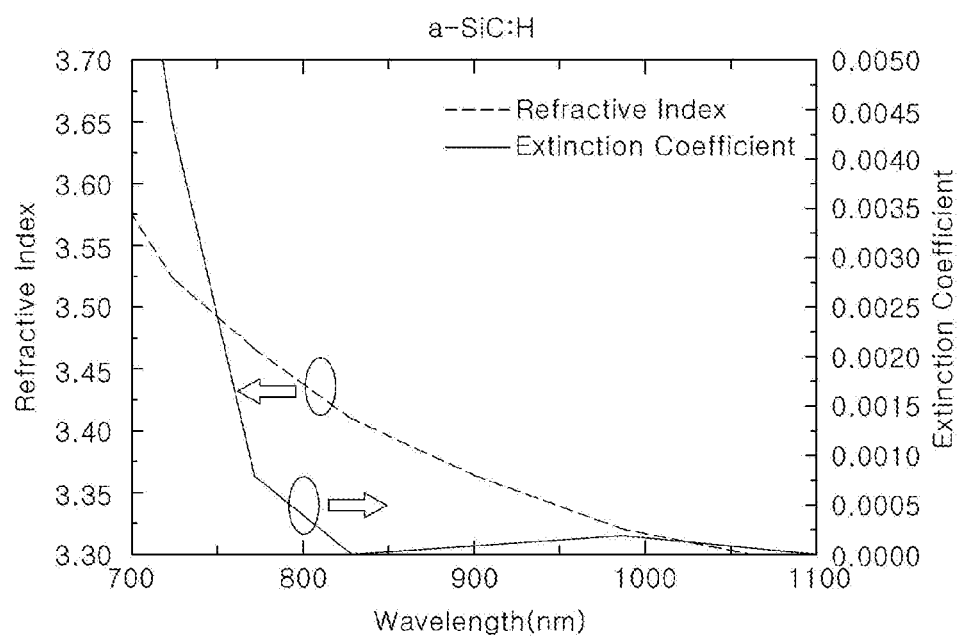
FIG. 5B is a graph depicting refractive index and extinction coefficient values of an SiC:H layer suitable for an optical filter according to an exemplary embodiment depending upon wavelength.

FIG. 5B is a graph depicting refractive index and extinction coefficient values of an SiC:H layer suitable for the optical filter according to an exemplary embodiment depending upon wavelength. The refractive index and the extinction coefficient of the Si:H layer were calculated by depositing a single layer on a glass substrate and measuring transmission and reflectivity of the single layer, followed by accurate calculation using Macleod software.

Referring to FIG. 5B, the refractive index of the SiC:H layer monotonously decreased in the wavelength range of 700 nm to 1,100 nm. The refractive index of the SiC:H layer was higher than 3.3 in the wavelength range of 700 nm to 1,050 nm and was higher than about 3.34 at a wavelength of 940 nm.

The extinction coefficient of the SiC:H layer rapidly decreased as the wavelength increased from 700 nm and was a very small value of less than 0.0001 and approaching 0 in the wavelength range of 800 nm to 1,000 nm, particularly in the wavelength range of 800 nm to 900 nm. Then, as the wavelength increased to 1,100 nm, the extinction coefficient of the SiC:H layer increased and then decreased again. The extinction coefficient of the SiC:H layer was less than 0.0005 in the wavelength range of 800 nm to 1,100 nm. In particular, at a wavelength of 940 nm, the extinction coefficient of the SiC:H layer was smaller than the extinction coefficient of the Si:H layer.

Figure 5C:
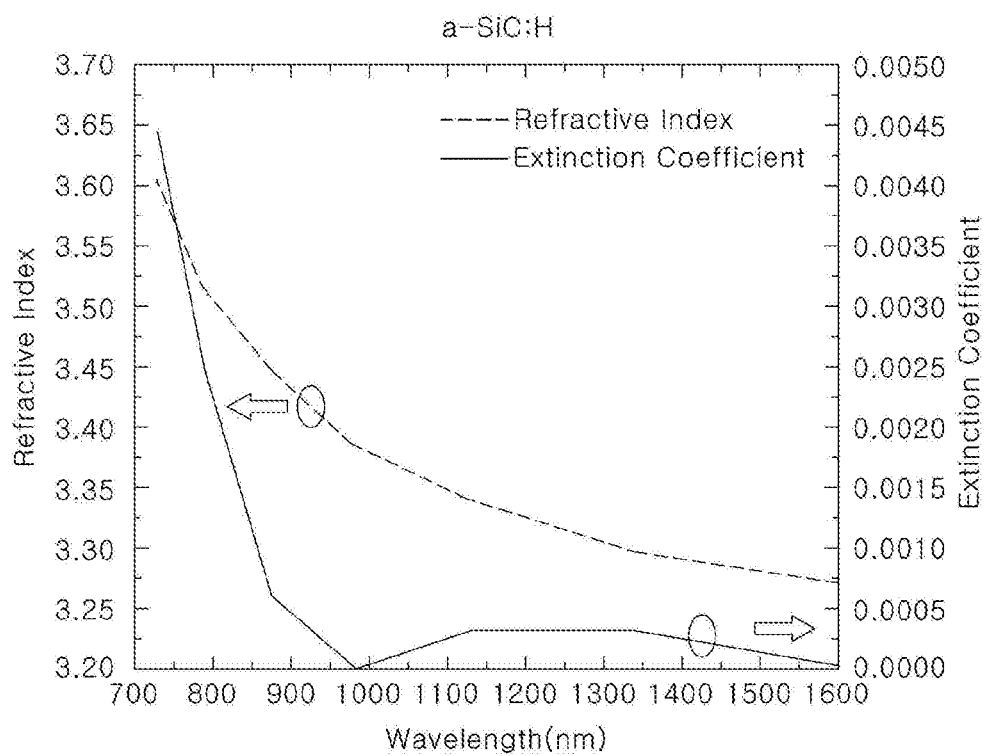
FIG. 5C is a graph depicting refractive index and extinction coefficient values of an SiC:H layer suitable for an optical filter according to an exemplary embodiment depending upon wavelength.

The refractive index and the extinction coefficient of the SiC:H layer may be controlled, particularly such that a local minimum of the extinction coefficient corresponds to a target wavelength, by controlling the fluxes of $H_2$ and $CH_4$ and the MF power. For example, as shown in FIG. 5C, the local minimum of the extinction coefficient may be placed in the wavelength range of 900 nm to 1,000 nm. Since the local minimum of the extinction coefficient of the SiC:H layer approaches 0, the SiC:H layer has a better extinction coefficient with respect to a target wavelength than the Si:H layer. Accordingly, the optical filter including the SiC:H layer has higher transmission than the optical filter including the Si:H layer.

In particular, carbon-added hydrogenated silicon (a-SiC:H) is known as a material having higher bonding energy than hydrogenated silicon (a-Si:H) free from carbon and thus has high radiation resistance, high stability at high temperature, and high thermal conductivity.

Figure 7:
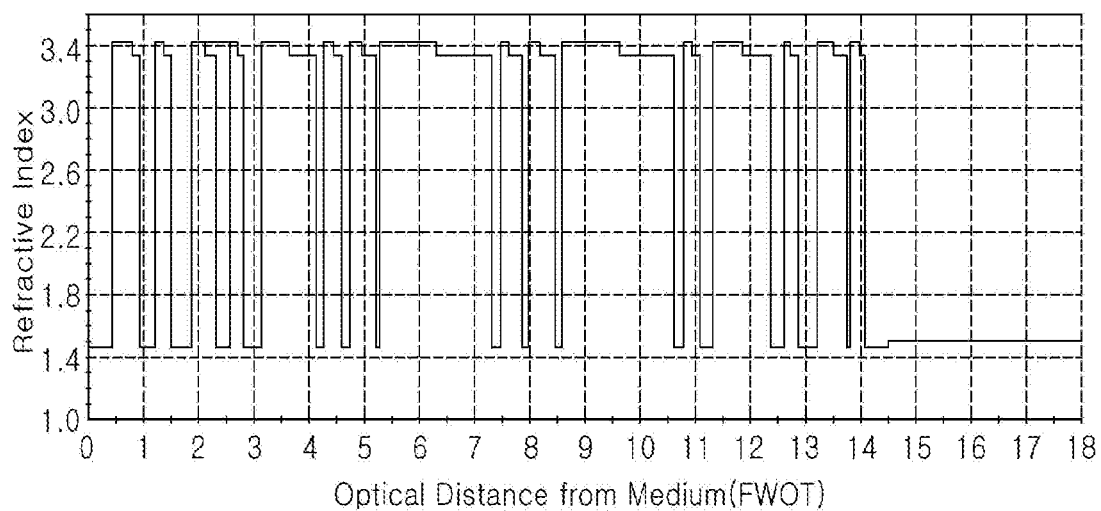
FIG. 7 is a schematic view illustrating a refractive index of the first filter layer of the optical filter according to the exemplary embodiment depending upon optical distance.
Figure 8:
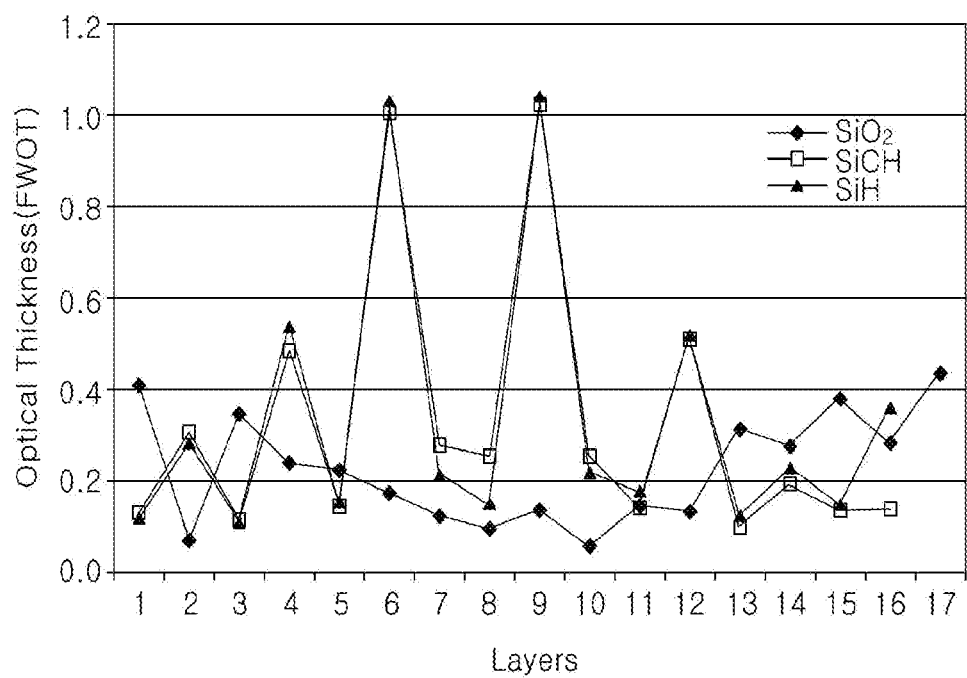
FIG. 8 is a graph depicting optical thicknesses of the layers in the first filter layer of the optical filter according to the exemplary embodiment.

FIG. 6 is a table illustrating thicknesses of layers in a first filter layer of an optical filter according to an exemplary embodiment, FIG. 7 is a schematic view illustrating a refractive index of the first filter layer of the optical filter according to the exemplary embodiment depending upon optical distance, and FIG. 8 is a graph depicting optical thicknesses of the layers in the first filter layer of the optical filter according to the exemplary embodiment.

Here, a-Si:H was used for the higher refractive index layers H, a-SiC:H was used for the medium refractive index layers M, and $SiO_2$ was used for the lower refractive index layers L. In addition, the a-Si:H layers were deposited under the deposition conditions for the Si:H layer shown in FIG. 5A and the a-SiC:H layers were deposited under the deposition conditions for the SiC:H layer shown in FIG. 5B.

First, referring to FIG. 6, the first filter layer 200 is composed of a total of 49 layers stacked in the sequence of L/M/H/L/M/H on the glass substrate 100. The uppermost layer and the lowermost layer are the lower refractive index layers L, particularly SiO$_2$ layers. The first filter layer 200 has a total thickness of less than 6 specifically about 5,440 nm.

FIG. 6 shows the thicknesses of the layers in the first filter layer 200, as represented by physical thicknesses, and FIG. 7 and FIG. 8 show the thicknesses of the layers in the first filter layer 200, as represented by optical distances or optical thicknesses (physical thickness×refractive index). In FIG. 7 and FIG. 8, FWOT (full wavelength optical thickness) indicates a value corresponding to the magnitude of the central wavelength $\lambda_0$, and the optical distance or the optical thickness is represented in multiples of FWOT.

Referring to FIG. 7 and FIG. 8, the first filter layer 200 may include at least two pairs of higher refractive index layers H and medium refractive index layers M, each pair of which includes the higher refractive index layer H (SiH) and the medium refractive index layer M (SiCH) disposed adjacent to each other and having a total optical thickness 1.6 times greater than the central wavelength $\lambda_0$, for example, 940 nm. Furthermore, in at least one of the at least two pairs, the total optical thickness of the higher refractive index layer H and the medium refractive index layer M may be greater than two times the central wavelength $\lambda_0$.

These at least two pairs of higher refractive index layers H and medium refractive index layers M are disposed inside the first filter layer 200 and layers each having an optical thickness of less than 0.4$\lambda_0$, specifically 0.3$\lambda_0$, may be disposed between the at least two pairs of higher refractive index layers H and medium refractive index layers. In particular, at least three lower refractive index layers L (SiO$_2$) may be disposed between these at least two pairs. Accordingly, at least two higher refractive index layers and at least two medium refractive index layers may be disposed between these at least two pairs.

As shown in FIG. 8, the at least three lower refractive index layers L may have a smaller optical thickness than the higher refractive index layer H or the medium refractive index layer M disposed adjacent thereto. In addition, the higher refractive index layers(H) disposed in each region between the at least three lower refractive index layers L may have a smaller refractive index than the medium refractive index layer M adjacent thereto.

Furthermore, each of the at least two pairs of higher refractive index layers H and medium refractive index layers M may include a higher refractive index layer H having an optical thickness 0.8 times greater than the central wavelength $\lambda_0$ or a medium refractive index layer M having an optical thickness 0.8 times greater than the central wavelength $\lambda_0$. In particular, as shown in FIG. 8, in each of the at least two pairs, all of the higher refractive index layers H and the medium refractive index layers M may have an optical thickness 0.8 times greater than the central wavelength $\lambda_0$, specifically 1 time greater than the central wavelength $\lambda_0$. That is, all of the higher refractive index layers H and the medium refractive index layers M may have a greater optical thickness than the central wavelength $\lambda_0$.

The optical filter can cause a blue shift phenomenon in which the central wavelength CWL shifts towards a short wavelength side as the angle of incidence (AOI) increases.

The optical filter according to the exemplary embodiment suppresses the blue shift of the central wavelength caused by increase in the angle of incidence, thereby improving stability of the pass band.

For example, the optical filter is provided with pairs of higher refractive index layers H and medium refractive index layers M, in which the total optical thickness of the higher refractive index layer H and the medium refractive index layer M in each pair is 1.6 times greater than the central wavelength $\lambda_0$, specifically two times greater than the central wavelength $\lambda_0$, thereby suppressing the blue shift of the central wavelength depending upon the angle of incidence.

Figure 9:
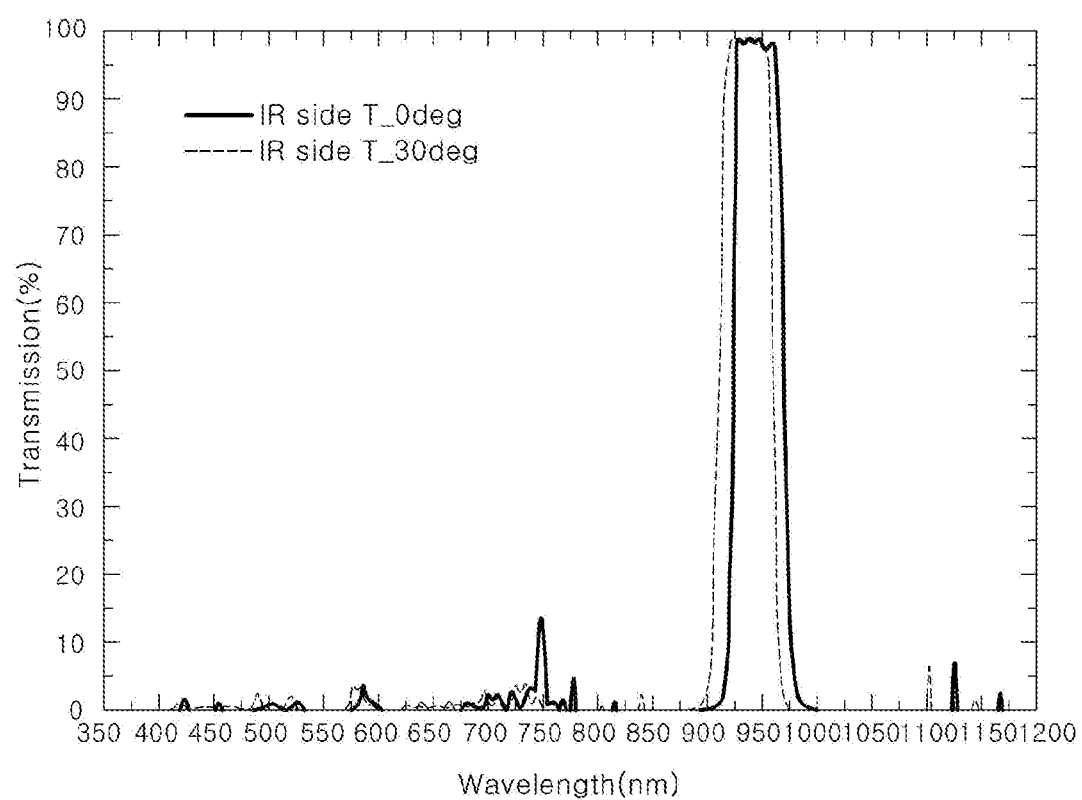
FIG. 9 is a graph illustrating transmission of the first filter layer shown in FIG. 6.

FIG. 9 is a graph illustrating transmission of the first filter layer shown in FIG. 6. Transmission of the first filter layer was simulated using Macleod software based on the thicknesses and the refractive indexes of the layers of FIG. 6 formed on a 0.21 mm thick glass substrate.

Referring to FIG. 9, the first filter layer 200 has a wavelength band having a high transmission of 90% or more, specifically 96% or more, in the wavelength range of 750 nm to 1,050 nm. In addition, it can be seen that the first filter layer 200 has characteristics of the band pass filter. Here, it should be noted that the first filter layer 200 has a transmission of about 10% at a wavelength of about 750 nm.

It can be confirmed that the blue shift of the central wavelength CWL occurs with increasing angle of incidence.

Figure 11:
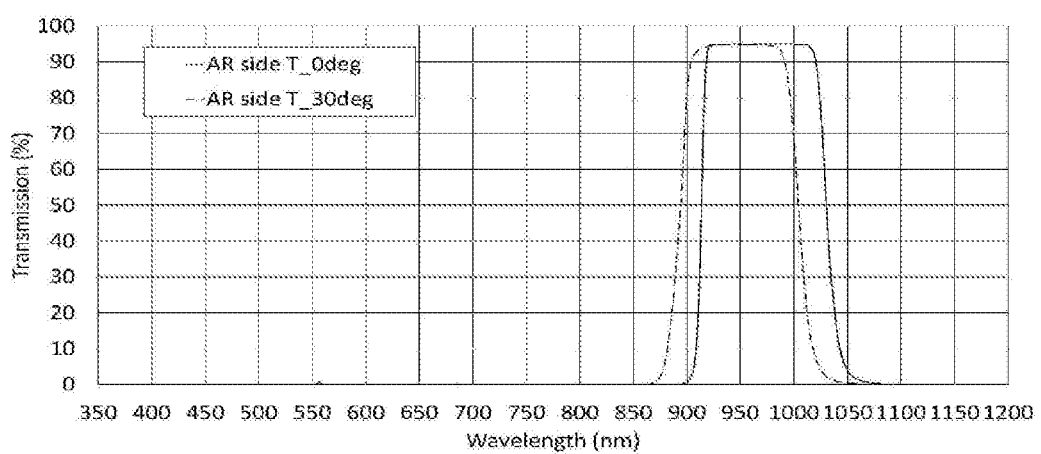
FIG. 11 is a graph illustrating transmission of the second filter layer of the optical filter according to the exemplary embodiment.

FIG. 10 is a table illustrating the structure and thickness of each of the layers in the second filter layer 300 of the optical filter according to an exemplary embodiment and FIG. 11 is a graph illustrating transmission of the second filter layer 300 of the optical filter according to the exemplary embodiment.

Referring to FIG. 10, the second filter layer 300 according to this embodiment includes coating layers of Si:H/SiO$_2$. Here, the thicknesses of the layers and the total number of layers may be adjusted to have transmission with respect to a specific wavelength range.

For example, the second filter layer 300 may have a structure in which Si:H and SiO$_2$ materials are alternately stacked in the sequence of H/L/H/L. Alternatively, both the uppermost layer and the lowermost layer may be lower refractive index layers L.

In addition, for example, as shown in FIG. 10, the second filter layer 300 may include 34 coating layers and have a stacked structure of pairs of SiH/SiO$_2$ coating layers. The second filter layer may have a total thickness of 4 µm or less, specifically about 3,955 nm. The thickness and thickness ratio of each of the layers in the second filter layer 300 may not be constant. For example, referring to FIG. 10, the Si:H layers and the SiO$_2$ layers may have different thicknesses (nm).

Referring to FIG. 11, the second filter layer 300 may have a wavelength band having a transmission of 90% or more in the wavelength range of 900 nm to 1,050 nm. The second filter layer 300 may have a light blocking rate of 95% or more in the wavelength range of 350 nm to 1200 nm excluding the wavelength range of 900 nm to 1,050 nm. For example, the second filter layer 300 may have a light blocking rate of 95% or more at least over the visible spectrum.

As shown in FIG. 11, the second filter layer 300 may be a band pass filter. Furthermore, the second filter layer 300 may have a function of an interference filter for prevention of reflection.

Although the second filter layer 300 is illustrated as having characteristics of the band pass filter in this embodiment, it should be understood that, for example, the second filter layer may be formed to have characteristics of an edge filter or a long wavelength pass (LWP) filter allowing transmission of light having a specific wavelength or more.

Figure 13:
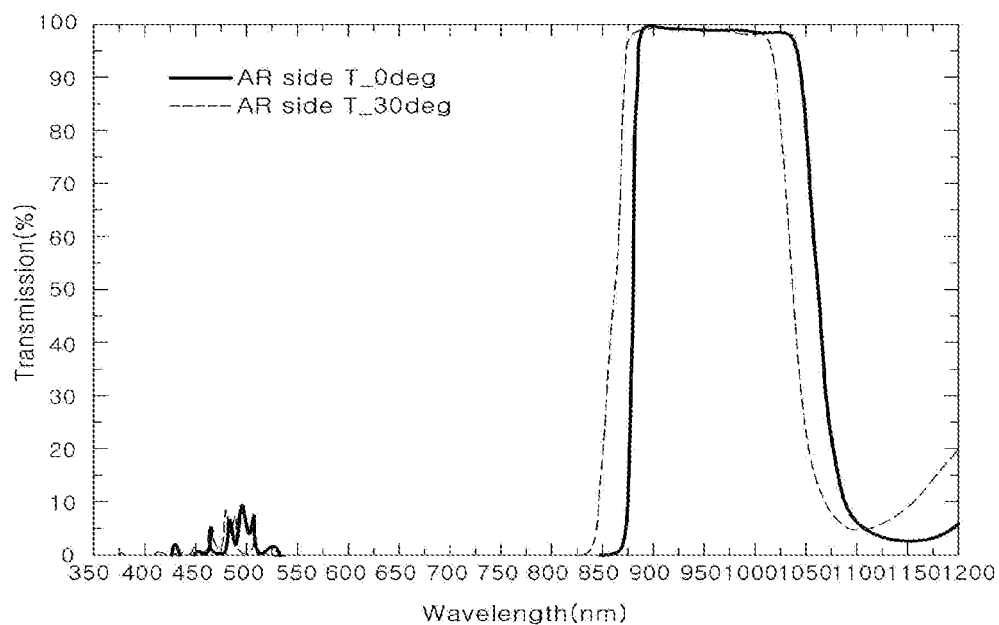
FIG. 13 is a graph illustrating transmission of the second filter layer shown in FIG. 12.

FIG. 12 is a table illustrating structure and thickness of a second filter layer according to another exemplary embodiment and FIG. 13 is a graph illustrating transmission of the second filter layer shown in FIG. 12.

Referring to FIG. 12, the second filter layer according to this embodiment includes coating layers of SiC:H/SiO$_2$. Here, the thicknesses of the layers and the total number of layers may be adjusted to have transmission with respect to a specific wavelength range.

For example, the second filter layer may have a structure in which SiO$_2$ layers and SiC:H layers are alternately stacked in the sequence of L/H/L/H. In addition, for example, as shown in FIG. 20, the second filter layer may include 33 coating layers and have a stacked structure in which the uppermost coating layer and the lowermost coating layer are SiO$_2$ layers having a low refractive index. The second filter layer may have a total thickness of less than 5 μm, specifically less than 4 μm. According to this embodiment, the second filter layer may have a total thickness of about 3,656 nm.

FIG. 13 is a graph illustrating transmission of the second filter layer shown in FIG. 12, in which the transmission of the second filter layer was simulated using Macleod software based on the thicknesses and the refractive indexes of the layers in the second filter layer shown in FIG. 12. As shown in FIG. 13, the second filter layer may have a wavelength band having a high transmission of 90% or more in the wavelength range of 900 nm to 1,050 nm. On the contrary, the second filter layer has a high light blocking rate in the wavelength range of 350 nm to 1,200 nm excluding the wavelength band of 900 nm to 1,050 nm. Particularly, the second filter layer has a high light blocking rate of 955 or more in the wavelength range of 550 nm to 850 nm.

Figure 14:
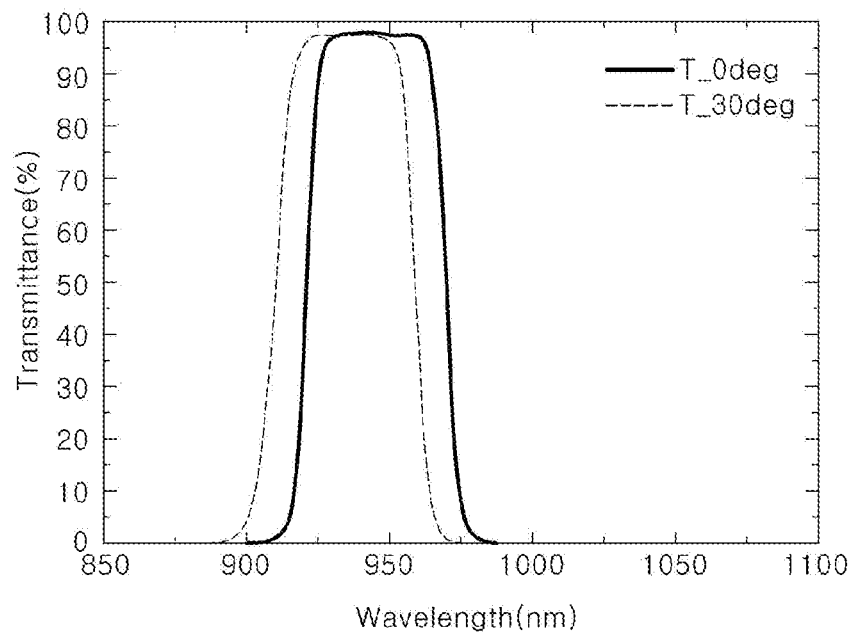
FIG. 14 is a graph illustrating transmission of an optical filter according to an exemplary embodiment depending upon angle of incidence.

FIG. 14 is a graph illustrating transmission of an optical filter according to an exemplary embodiment depending upon angle of incidence.

The optical filter according to this embodiment includes the first filter layer 200 of FIG. 6 and the second filter layer 300 of FIG. 12 disposed on opposite surfaces of a glass substrate 100 having a thickness of 0.21 mm, respectively. The transmission graph shown in FIG. 14 was obtained through simulation using Macleod software. The first filter layer and the second filter layer may have a total thickness of less than 10 μm. The first filter layer is a band pass filter having a pass band and the second filter layer is a band pass filter having a broader pass band than the first filter layer. The second filter layer has a higher blocking rate in a blocking region outside the pass band and a transition region.

Referring to FIG. 14, the optical filter according to this embodiment has a pass band having a transmission of 90% or more, specifically 96% or more, in the wavelength range of 900 nm to 1,000 nm. In addition, the blue shift of the central wavelength was less than 12 nm, specifically, 10 nm, at an angle of incidence of 0 to 30 degrees.

The optical filter may be used as an IR transmission filter allowing transmission of near IR light therethrough.

The optical filter according to this embodiment is a combination of a first band pass filter having a transmission of at least 80% or more in a first wavelength range and a second band pass filter having a transmission of at least 80% or more in a second wavelength range.

In another embodiment, the optical filter may be a combination of a band pass filter having a transmission of at least 80% or more in the first wavelength range and an edge filter having a transmission of at least 80% or more in the second wavelength range.

The optical filter according to this embodiment has high blocking characteristics of OD2 or more at an angle of incidence of 0 degrees in the wavelength range of 350 nm to 1,100 nm excluding the wavelength range of 900 nm to 1,000 nm. In particular, the optical filter has high blocking characteristics of OD2.5 or more in the visible spectrum.

The optical filters according to the exemplary embodiments may be band pass filters having a transmission of at least 80% or more, specifically 90% or more, specifically 96% or more, in a wavelength range in which the first wavelength range overlaps the second wavelength range.

Figure 15:
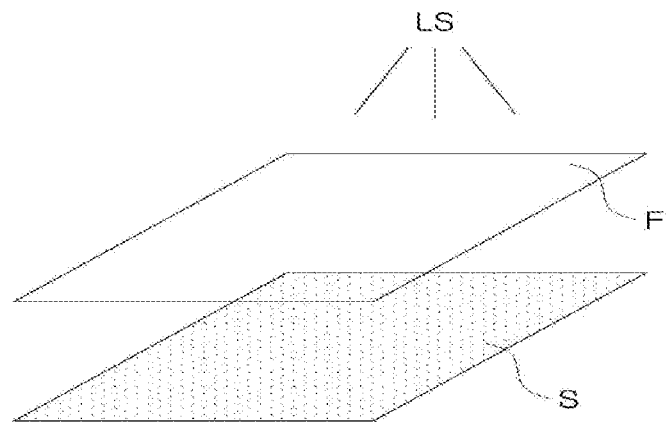
FIG. 15 is a schematic perspective view of a sensor system according to an exemplary embodiment.

FIG. 15 is a schematic perspective view of a sensor system according to an exemplary embodiment.

Referring to FIG. 15, the sensor system includes a light source LS, a sensor S, and an optical filter F.

The optical filter F may be disposed above the sensor S. The light source LS may emit light toward the optical filter F. Light emitted from the light source LS may pass through the optical filter F in the sequence of the first filter layer 200, the substrate 100, and the second filter layer 300. Only the light having passed through the first filter layer 200, the substrate 100 and the second filter layer 300 and being in a specific wavelength range can be detected by the sensor 1000.

Although the light source LS is illustrated as being disposed above the optical filter F to face the sensor S, the light source LS may be disposed at a side of the sensor S. The light source LS may emit light having a specific wavelength, for example, a wavelength of 940 nm, toward an object and light reflected from the object may enter the optical filter F. The optical filter F allows transmission of light in a wavelength band including the specific wavelength and blocks light in other wavelength ranges excluding the wavelength band. As a result, the optical filter removes noise due to background light.

The optical filters according to the exemplary embodiments described above are suitable for optical filters allowing transmission of light in the IR wavelength spectrum. Although the optical filter is illustrated as being disposed above the sensor in the above embodiment, the optical filters according to the exemplary embodiments may be applied to various devices for regulation of transmission and reflection characteristics in the IR wavelength spectrum.

Although embodiments of the present disclosure have been described herein with reference to the accompanying drawings, it should be understood by those skilled in the art that these embodiments are given by way of illustration only, and that various changes and modifications can be made without departing from the spirit and scope of the present disclosure. For example, an appropriate result can be achieved although the described techniques may be implemented in different sequences from the descriptions and/or components of the described systems, structures, devices, and the like are coupled or combined in a different form from the descriptions, replaced or substituted with other components or their equivalents.

Therefore, other implementations, other embodiments, and equivalents of the appended claims fall within the scope of the appended claims.

What is claimed is:

1. An optical filter comprising:
a substrate; and
a first filter layer stacked on a first surface of the substrate,
wherein the first filter layer comprises a plurality of lower refractive index layers having a refractive index of less than 3; a plurality of higher refractive index layers having a refractive index of greater than 3; and a plurality of medium refractive index layers having a refractive index of 3 or more and smaller than that of the higher refractive index layers, and one higher refractive index layer and one medium refractive index layer are interposed in at least one of regions between two lower refractive index layers, wherein one higher refractive index layer and one medium refractive index layer are interposed in each of the regions between the two lower refractive index layers, and wherein the first filter comprises pairs of higher refractive index layers and medium refractive index layers, each pair comprising a higher refractive index layer and a medium refractive index layer disposed adjacent to each other, wherein at least two of the pairs have a total optical thickness of at least 1.6 times greater than a central wavelength, respectively.

2. The optical filter according to claim 1, wherein the lower refractive index layers comprise at least one selected from the group consisting of SiOx, TiOx, NbOx, TaOx, AlOx, SiNx, TiNx, NbNx, TaNx, AlNx, and mixtures thereof.

3. The optical filter according to claim 1, wherein each of the at least two pairs has a total optical thickness of the higher refractive index layer and the medium refractive index layer greater than 2 times of the central wavelength.

4. The optical filter according to claim 1, wherein each of the at least two pairs comprises a higher refractive index layer having an optical thickness greater than the central wavelength.

5. The optical filter according to claim 1, wherein each of the at least two pairs comprises a medium refractive index layer having an optical thickness greater than the central wavelength.

6. The optical filter according to claim 1, wherein at least three lower refractive index layers are disposed between the at least two pairs, and a higher refractive index layer disposed in each of regions between the at least three lower refractive index layers has a smaller optical thickness than the medium refractive index layer adjacent thereto.

7. The optical filter according to claim 1, wherein the first filter layer is formed on the substrate by a middle frequency (MF) magnetron sputtering method.

8. The optical filter according to claim 1, wherein each of the higher refractive index layers comprises a hydrogenated silicon (Si:H) layer and each of the medium refractive index layers comprises a carbon-added hydrogenated silicon (SiC:H) layer.

9. The optical filter according to claim 8, wherein the carbon-added hydrogenated silicon (SiC:H) layer has a local minimum of an extinction coefficient of less than 0.0001 in a wavelength range of 800 nm to 1,000 nm.

10. The optical filter according to claim 8, wherein the optical filter has a transmission of 96% or more in a specific wavelength range and a central wavelength blue shift of less than 12 nm at an angle of incidence in the range of 0 to 30 degrees.

11. The optical filter according to claim 10, wherein the first filter layer is a band pass filter allowing transmission of light in the specific wavelength range.

12. The optical filter according to claim 11, wherein the specific wavelength range is in the range of 800 nm to 1,000 nm.

13. The optical filter according to claim 1, further comprising:

a second filter layer disposed on the substrate and formed by alternately stacking layers having different refractive indexes.

14. The optical filter according to claim 13, wherein a total thickness of the first filter layer and the second filter layer is less than 10 μm.

15. The optical filter according to claim 13, wherein the first filter layer is a band pass filter and the second filter layer has a pass band comprising a pass band of the first filter layer.

16. The optical filter according to claim 13, wherein the layers having different refractive indexes comprise a carbon-added hydrogenated silicon (SiC:H) layer.

17. The optical filter according to claim 16, wherein the second filter layer has a blocking rate of 95% or more with respect to at least some fraction of light in a visible spectrum.

* * * * *